United States Patent
Garrison Stuber et al.

(10) Patent No.: US 12,355,240 B2
(45) Date of Patent: Jul. 8, 2025

(54) FAILURE DETECTION WITHIN A GROUP OF POWER FLOW CONTROL MODULES

(71) Applicant: Smart Wires Inc., Durham, NC (US)

(72) Inventors: Michael Thomas Garrison Stuber, Newman Lake, WA (US); Adeel Ahmad Khan, Lahore (PK)

(73) Assignee: Smart Wires Inc., Durham, NC (US)

( * ) Notice: Subject to any disclaimer, the term of this patent is extended or adjusted under 35 U.S.C. 154(b) by 4 days.

(21) Appl. No.: 18/486,292

(22) Filed: Oct. 13, 2023

(65) Prior Publication Data

US 2024/0128748 A1    Apr. 18, 2024

(30) Foreign Application Priority Data

Oct. 14, 2022    (PK) .................................... 684/2022

(51) Int. Cl.
H02J 3/00    (2006.01)

(52) U.S. Cl.
CPC ................... H02J 3/0012 (2020.01)

(58) Field of Classification Search
CPC .................................... H02J 3/0012
USPC .......................................... 307/43
See application file for complete search history.

(56) References Cited

U.S. PATENT DOCUMENTS

| | | |
|---|---|---|
| 4,369,523 A | 1/1983 | Seki et al. |
| 4,402,903 A | 9/1983 | Lenderking |
| 4,427,620 A | 1/1984 | Cook |
| 4,661,310 A | 4/1987 | Cook et al. |
| 5,110,189 A | 5/1992 | Haines |
| 5,136,410 A | 8/1992 | Heiling et al. |
| 5,349,457 A | 9/1994 | Bears |
| 5,809,543 A | 9/1998 | Byers et al. |
| 5,894,362 A | 4/1999 | Onaka et al. |
| 6,484,126 B1 | 11/2002 | Brown, Sr. et al. |
| 6,556,953 B2 | 4/2003 | Lay et al. |
| 6,690,889 B2 | 2/2004 | Desthieux et al. |
| 6,732,656 B1 | 5/2004 | Heyse et al. |
| 6,821,026 B2 | 11/2004 | Devine et al. |
| 6,961,306 B2 | 11/2005 | Ying |
| 6,965,560 B2 | 11/2005 | Ying et al. |
| 7,046,621 B2 | 5/2006 | Wang et al. |
| 7,046,622 B2 | 5/2006 | Ying et al. |
| 7,065,039 B2 | 6/2006 | Ying |
| 7,295,572 B1 | 11/2007 | Haapala |
| 7,957,270 B2 * | 6/2011 | Pascasio, Jr. ....... H04J 14/0241 709/251 |
| 8,155,516 B2 | 4/2012 | Sokolowski et al. |
| 8,457,488 B2 | 6/2013 | Almog |

* cited by examiner

*Primary Examiner* — Hal Kaplan
(74) *Attorney, Agent, or Firm* — Womble Bond Dickinson (US) LLP

(57) ABSTRACT

A power flow control system is disclosed. The system includes impedance injection modules (IIMs) distributed along and connected in series to one or more power transmission lines. The system further includes dual-ring fiber optic networks, with each dual-ring fiber optic network including a pair of fiber rings that provide data flow in opposite directions. The system further includes redundant power line coordinators in communication with the IIMs through the dual-ring fiber optic networks.

20 Claims, 6 Drawing Sheets

FAILURE DETECTION WITHIN A GROUP OF POWER FLOW CONTROL MODULES

CROSS-REFERENCE TO RELATED APPLICATIONS

This application claims the priority and benefit of Pakistan Patent Application No. 684/2022 filed on Oct. 14, 2022, the disclosure of which is incorporated herein by reference in its entirety.

TECHNICAL FIELD

This application relates to power flow control systems, and more specifically, embodiments of the present application relate to communication systems and methods for the power flow control of impedance injection modules connected to electrical transmission lines.

BACKGROUND

FIG. 1 is a block diagram illustrating the conventional use of impedance injection modules in a power transmission system. Referring to FIG. 1, power transmission system 100 includes a long power transmission line 105, a generator 101, a load 102, transformers 105-01 and 105-02, and multiple impedance injection modules 110 (shown as 110-01, . . . , 110-$nn$). Long power transmission line 105 is used for power transmission between generator 101 and load 102. Generator 101 and load 102 are connected or coupled to one another using transformers 105-01 and 105-02. Impedance injection modules 110 are connected to transmission line 105. Impedance injection modules 110 are used to improve the transmission's power factor, reliability, and efficiency. In this example, the impedance injection modules 110 are shown to be connected in series, though they can also be connected in parallel (shunt) or a combination of series and shunt. FIG. 1 shows a single-phase system, though typical transmission line systems are three-phased.

For power transmission system 100 to operate correctly, communication between the impedance injection modules 110 and the control system must be reliable. The control of modules 110 needs to detect failures in both the communication network and the impedance injection modules 110. In addition, the control system must be capable of reconfiguring the injection modules 110. This is further complicated because the impedance injection modules 110 are distributed over long distances.

BRIEF DESCRIPTION OF THE DRAWINGS

Embodiments of the application are illustrated by way of example and are not limited to the figures of the accompanying drawings in which like references indicate similar elements.

DETAILED DESCRIPTION

According to some embodiments, a fleet or group of impedance injection modules is connected to a power transmission line. The injection modules can inject impedance into the transmission line on a per-phase basis. A fiber-optic network including dual rings (e.g., three dual rings) may connect the impedance injection modules and a set of redundant power line coordinators. Methods for controlling the impedance injection modules and gathering telemetry data from impedance injection modules using the power line coordinators are described. Additional methods for detecting failures and reconfiguring the fiber-optic network and injection modules are described.

According to one aspect, a power flow control system is provided. The system may include impedance injection modules (IIMs) distributed along and connected in series to one or more power transmission lines. The system may further include dual-ring fiber optic networks, with each dual-ring fiber optic network including a pair of fiber rings that provide data flow in opposite directions. The system may further include redundant power line coordinators in communication with the IIMs through the dual-ring fiber optic networks.

According to another aspect, a method for a power line coordinator is provided. A command or a telemetry data request may be sent to a target IIM. It may be determined whether a response was received from the target IIM. If it is determined that the response was received from the target IIM, the response may be examined to determine whether it includes an alert. If it includes an alert, the alert may be analyzed, and a power flow control system may be reconfigured and configuration information of the power flow control system may be saved based on it.

According to yet another aspect, a method for an impedance injection module is provided. It may be determined whether a command has been received within a time period. In response to determining that the command has been received within the time period, it may be determined whether the command is a telemetry data request. In response to determining that the command is a telemetry data request, telemetry data collected and measured by the impedance injection module may be sent. Otherwise, in response to determining that the command is not a telemetry data request, the command may be performed and a response is sent.

Figure 2:
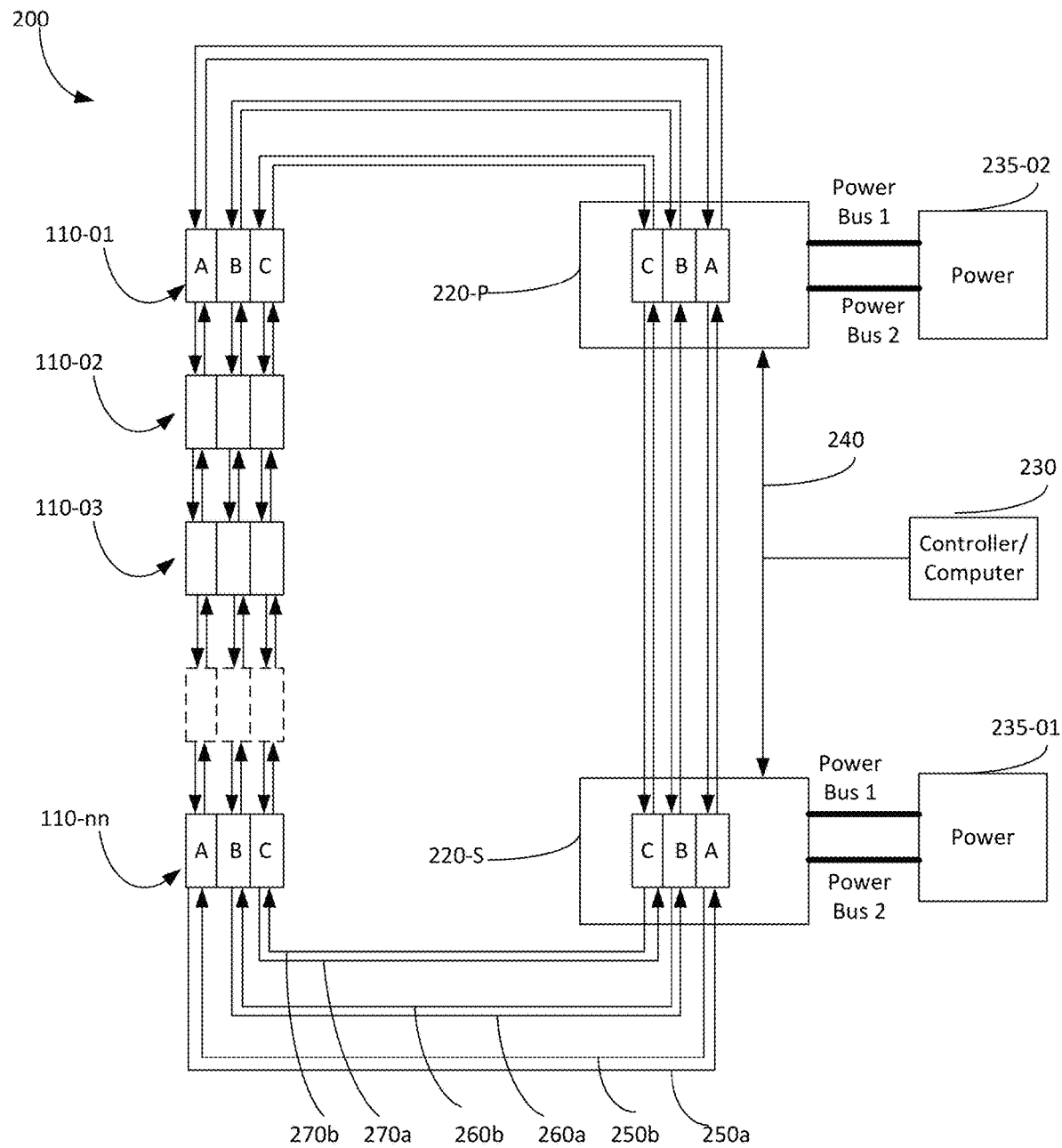
FIG. 2 is a block diagram illustrating a system having three dual-ring fiber optic networks connecting a fleet or group of impedance injection modules and a set of redundant power line coordinators according to an embodiment.

FIG. 2 is a block diagram illustrating a system having three dual-ring fiber optic networks connecting a fleet or group of impedance injection modules and a set of redundant power line coordinators according to an embodiment. In system 200, a fleet of impedance injection modules (IIMs), shown as 110-01, 110-02, 110-03, . . . , 110$nn$, may be connected to three dual-ring fiber optic networks (labeled 250-270). It should be understood that while three dual-ring fiber optic networks are illustrated in FIG. 2, any number of dual-ring fiber optic networks may be implemented within system 200.

In an embodiment, the impedance injection module 110 may be connected to three-phase power transmission lines (not shown explicitly in the figure) and can be distributed along the power transmission lines. Each impedance injection module 110 may be connected to the three phases of the power transmission lines. For example, in FIG. 2 the three phases are labeled as A, B, and C. Impedance injection module 110 can change the impedance of each phase independently or in a coordinated fashion. Each impedance injection module 110 may operate independently from other IIMs. For example, IIM 110-01 can inject impedance on Phase A, whereas IIM 110-02 may not inject any impedance, and IIM 110-03 may inject impedance on Phase B, etc. Each phase of an IIM 110 may be connected to a dual-ring fiber optic network to allow data flow between the IIM 110 and power line coordinators 220. As an example, for phase A, fiber ring 250*a* of dual-ring fiber optic network 250*a-b* may provide data flow in a counterclockwise direction and fiber ring 250*b* of dual-ring fiber optic network 250*a-b* may provide data flow in a clockwise direction, or vice versa. Similarly, fiber rings 260*a* and 260*b* of dual-ring fiber optic network 260*a-b* may allow data flow in the counterclockwise and clockwise directions for phase B, respectively. Similarly, for phase C, fiber rings 270*a* and 270*b* of dual-ring fiber optic network 270*a-b* may provide data flow in the counterclockwise and clockwise directions, respectively. Accordingly, each of dual-ring fiber optic networks 250*a-b*, 260*a-b*, and 270*a-b* may allow data flow in opposite directions.

In an embodiment, redundant power line coordinators (or PLC) 220-P and 220-S may coordinate the communication within the fiber rings 250*a-b*, 260*a-b*, and 270*a-b*. PLC 220-P may be a primary power line coordinator, and PLC 220-S may serve as a secondary power line coordinator. In some embodiments, PLC 220-S may take over as the primary power line coordinator in case of a failure of PLC 220-P. PLCs 220-S and 220-P may be respectively connected to power supply 235-01 and 235-02 via a set of redundant power buses (shown as Power Bus 1 and Power Bus 2). Each of power supplies 235-01 and 235-02 may include appropriate backup measures, such as a battery, generator, etc., ensuring PLC operation during power supply disruptions.

In an embodiment, PLC 220-P can issue commands or requests (e.g., telemetry data requests or data requests) to an IIM 110 via a fiber ring in either direction, e.g., using a counterclockwise fiber ring (such as fiber ring 250*a*, 260*a*, 270*a*) or a clockwise fiber ring (such as fiber ring 250*b*, 260*b*, 270*b*). PLC 220-P may select a default direction (e.g., counterclockwise) during regular operation. PLC 220-P can issue one or more commands on a per-phase basis. The commands or requests sent by PLC 220-P, for example, may be sent to IIM 110-01, which may forward them to IIM 110-02, which may forward them to IIM 110-03, and so on. The commands/requests may be serially forwarded until they reach a destination or target IIM 110-*nn*. In response to the command or request, IIM 110-*nn* may send an appropriate response back to PLC 220-P via a fiber ring. The response from IIM 110-*nn* may be serially forwarded until it reaches PLC 220-P. Failures during communications can occur when any one of the IIMs 110-*nn* is not functional or a part of the fiber ring is broken. PLC 220-P may take steps to detect the fault and appropriate corrective actions, which will be described in more detail herein below.

In an embodiment, a supervisory control of system 200 is provided by controller/computer 230. In an embodiment, the system 200, which includes fiber rings 250*a-b*, 260*a-b*, 270*a-b*, IIMs 110, and PLCs 220-P and 220-S is managed by a gateway (not explicitly shown). In another embodiment, the system management is included within a PLC 220. Generally, high-level commands are issued by controller/computer 230 (e.g., via a standardized communications protocol such as IEC-60870-5-101 or DNP3 (IEEE 1815)). When a gateway is used, it may receive those commands and submit them to the PLC. The gateway can be important when controller/computer 230 uses less common protocols. When a gateway is not used, the PLC 220 may receive commands issued by control/computer 230 directly. The commands and data requests can originate autonomously from within the controller 230 or a PLC 220. For example, controller 230 or a PLC 220 may request telemetry data from each IIM periodically (e.g., every 4 seconds, 2 minutes, etc.). Commands or requests can also be triggered by telemetry data received from IIM 110, IIM 110 response(s), changes detected in the transmission lines, or manually issued (e.g., by a grid operator, etc.) Telemetry data may include voltage, current, device temperature, device status, and/or other diagnostic data, such as pump or fan RPM, communication statistics, etc. Commands may include impedance-related inductance/capacitance magnitude, angle (e.g., impedance lag/lead value), IIM mode of operation, IIM reconfiguration, etc. Commands generated by grid operators can be sent via computer or similar interfaces. Controller/computer 230 may communicate with the PLCs 220 via a suitable medium 240, such as ethernet, fiber channel, serial, etc. The choice of medium 240 may be determined by the geographical locations of controller 230 and PLC 220 and may include multiple media for redundancy.

Figure 3:
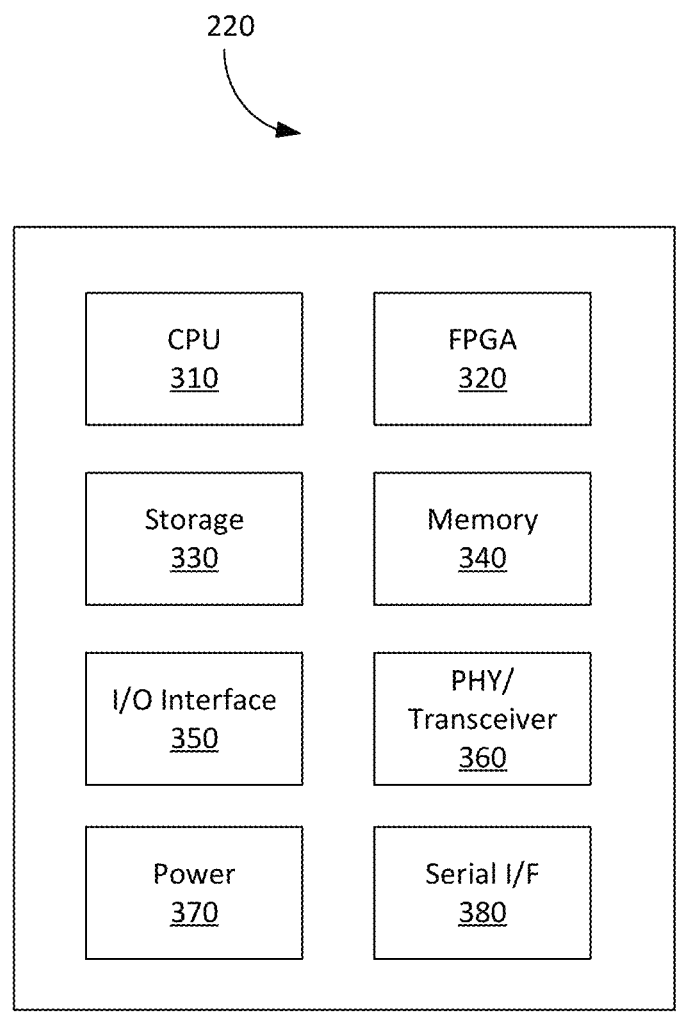
FIG. 3 is a block diagram illustrating a power line coordinator used in the system of FIG. 2 according to an embodiment.

FIG. 3 is a block diagram illustrating a power line coordinator used in system 200 according to an embodiment. As shown in FIG. 3, PLC 220 (which may be PLC 220-P or PLC 220-S of FIG. 2) includes one or more central processing units (CPUs) 310, field programmable gate array (FPGA) 320, storage 330, memory 340, I/O (input/output) interface 350, PHY/transceiver 360, power 370, and serial I/F (interface) 380. CPUs 310 may be used for control and sequence events etc. FPGA 320 provides programmability, configurability, and additional control functionality. FPGA 320 may implement protocol stacks and upper layers for various protocols supported by PLC 220 and can control multiple interfaces, such as fiber ring, ethernet, I/O interface 350, up sequence of power 370, etc. CPUs 310 can also be used for the upper protocol implementation. Storage 330 may include hard disk drive (HDD), solid state drive (SSD), other expandable storage media, etc. Storage 330 can be used to store programs or programming instructions executed by CPU 310, and FPGA 320 configuration(s). Storage 330 can also be used to store transactions of PLC 220 for traceability and debugging. Memory 340 can include volatile memory (e.g., random access memory (RAM)) and non-volatile memory (e.g., read-only memory (ROM)) and may be used for buffering. Memory 340 may also be used to temporarily store programs or programming instructions and data used by the CPU 310 and FPGA 320. PHY/transceiver 360 can be used as the PHY layer for interfacing the fiber channel rings and other interfaces such as ethernet, RF, etc. I/O interface 350 and serial I/F 380 may include general-purpose digital I/O and different serial protocols such as USB, RS-232, RS-488, etc., and may be used for debugging and control. I/O interface 350 may include digital inputs and outputs (I/Os) that allow a reaction to contact closure made by another device. For instance, an upstream device (e.g., controller/computer 230 or primary PLC 220-P of FIG. 2)

may close (or open) a switch, which is signaled on the I/O interface 350, thereby allowing the PLC 220 to respond. Similarly, PLC 220 may drive I/O interface 350 to a downstream device (e.g., secondary PLC 220-S or IIM 110 of FIG. 2). A common use of the digital I/Os is for integration with protective relays or electrical switching interlock controls. Serial I/F 380 can be used for console communications that allow a user to interact with PLC 220 with appropriate software (e.g., Hyperterminal, Minitel, putty, etc.). CPU 310 and FPGA 320 may also run upper-level protocols required for communication with IIM 110 (e.g., commands, telemetry) and controller/computer 230.

Figure 1:
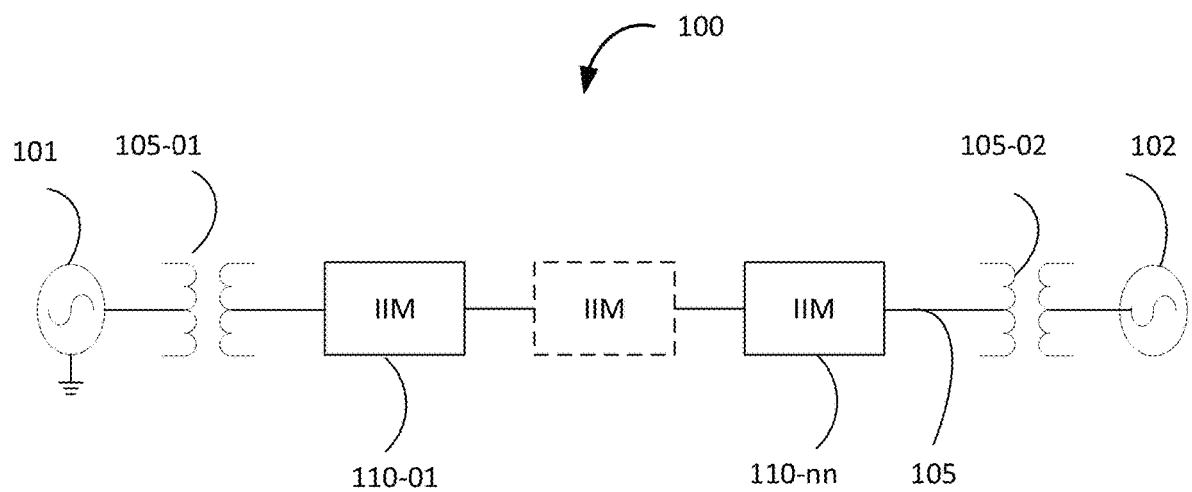
FIG. 1 is a block diagram illustrating the conventional use of impedance injection modules in a power transmission system 100.
Figure 4:
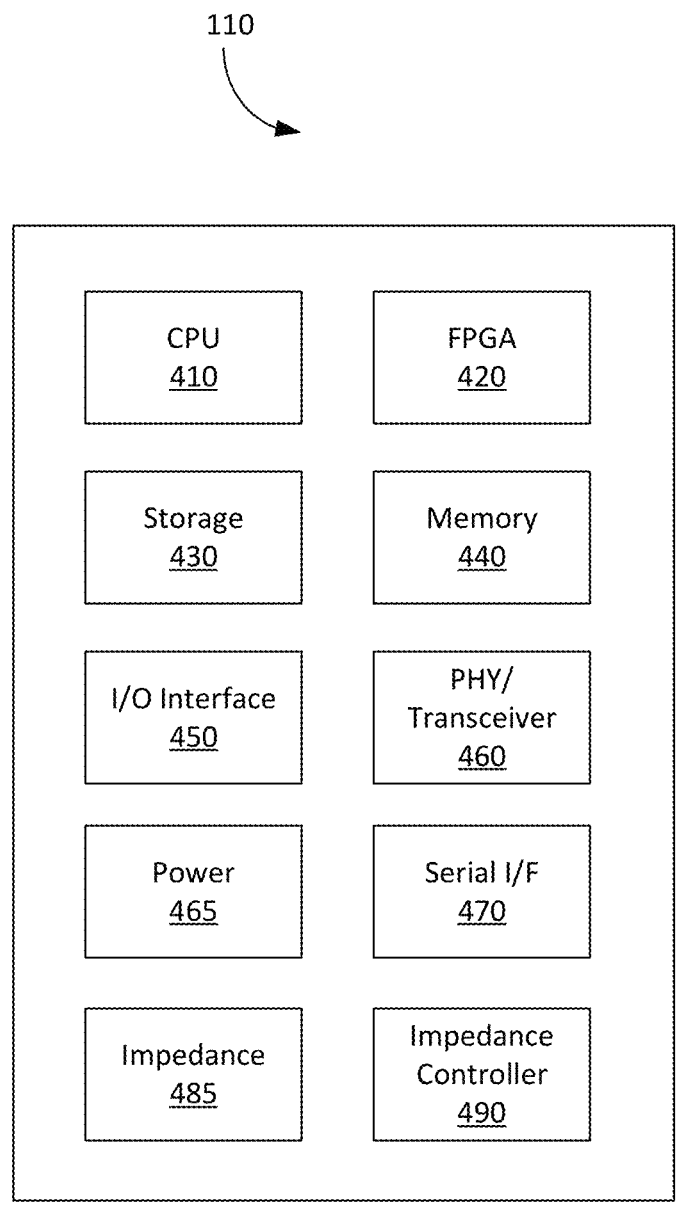
FIG. 4 is a block diagram illustrating an impedance injection module used in the system of FIG. 2 according to an embodiment.

FIG. 4 is a block diagram illustrating an impedance injection module used in system 200 according to an embodiment. As shown in FIG. 4, IIM 110 includes, but is not limited to, one or more CPUs 410, FPGA 420, storage 430, memory 440, I/O (input/output) interface 450, PHY/transceiver 460, power 465, serial I/F (interface) 470, impedance 485, and impedance controller 490. Except for impedance 485 and impedance control 490, the functionality of the components in IIM 110 is similar to the components in PLC 220 described previously, and for brevity sake, those similar components are not described again herein. In an embodiment, impedance 485 includes functionality (e.g., capacitor banks, etc.) that allows impedance injection into power transmission lines (e.g., transmission line 105 of FIG. 1). Impedance 485 may include other associated circuitry such as switches to make contact with the power transmission lines, and protection devices (e.g., metal-oxide varistor (MOV), triggered gap, etc.). Impedance controller 490 may include control circuits to control the functionality of impedance 485. The example in FIG. 4 shows each of impedance 485 and impedance control 490 as a single block (lumped), though impedance 485 and impedance control 490 can be distributed as several distributed elements. Internal communication (similar to the fiber rings shown in system 200 or other suitable means not explicitly shown in the figures) may be used for coordinating and communicating within the IIM 110.

Figure 5:
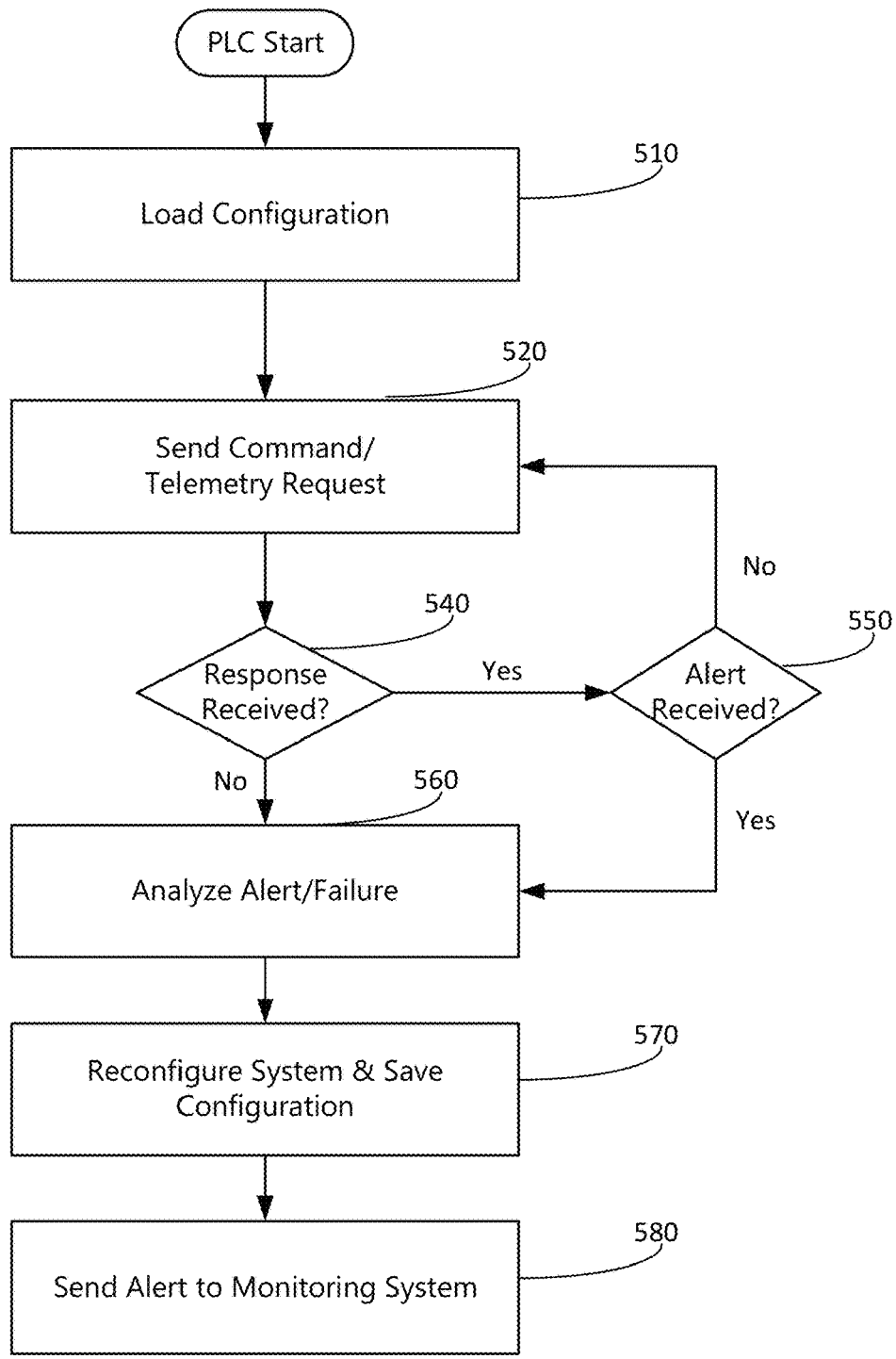
FIG. 5 is a flow diagram illustrating a process performed by the power line coordinator according to an embodiment.

FIG. 5 is a flow diagram illustrating a process performed by power line coordinator 220 of FIG. 3 according to an embodiment. Process 500 may be performed by processing logic which may include software, hardware, or a combination thereof.

Referring to process 500, at block 510, configuration of PLC 220 is loaded. The configuration can be loaded from storage 330 by CPUs 310 or FPGA 320. For example, the configuration can be loaded at power up, triggered by an event on an upstream device (signaled on I/O interface 350), or by a command issued by a user (e.g., using the console communication described previously). Configuration details may include whether the PLC 220 is a primary PLC 220-P or a secondary PLC 220-S. Additional details may include the number of IIM 110 in system 200, the relative positions of each IIM 110, for example as physically installed as well as in the communication fiber ring, the address of each IIM 110, the characteristics, timings, limits, and other tunable parameters of the impedance controller of each IIM 110, the specifications of each IIM 110, for example its maximum impedance injection capability, and its line current bearing capability during injection, etc. At block 520, PLC 220 may send a command or telemetry data request. As described previously, commands include impedance-related inductance/capacitance magnitude, angle (e.g., impedance lag/lead value), IIM reconfiguration, etc., and telemetry data may include voltage, current, temperature, other diagnostic data, etc. The command or request is forwarded to an appropriate IIM 110 (as previously described). At block 540, process 500 may determine whether a response was received from the addressed IIM 110. In an embodiment, process 500 may wait for a period of time before it times out and determines that there was no response received. If a response is received, process 500 proceeds to block 550. Otherwise, process 500 proceeds to block 560. At block 550, the received response is examined. If the response includes one or more alerts, process 500 proceeds to block 560. If there are no alerts, process 500 returns to block 520. At block 560, the alert(s) (received at block 550) or a failure to receive a response (at block 540) is analyzed.

Alerts

An alert may trigger a very specific action based on the nature or type of the alert. For instance, an IIM 110, in response to a request, may send an alert indicating that its operating parameters (e.g., temperature) is high (e.g., out of range or close to out of range). In response to this alert at block 570, process 500 may reconfigure the system (e.g., system 200 of FIG. 2) and save the system's configuration. In this example (e.g., high temperature), process 500 may issue a command to shut down the IIM 110. It may also provide additional commands to other IIMs 110 to compensate for the shutting down of the IIM 110 that issued the alert. Configuration information of the system may be updated, for example, the number of IIM 110 in the fiber ring, the position of each IIM 110 in the fiber ring, functionality of IIM, etc. are saved. At block 580, process 500 may send an alert to a monitoring system, which may reside in controller 230, or the grid supervisory control and data acquisition (SCADA) system, etc.

Response Failure

With reference again to block 560, process 500 may determine whether the failure is caused by an IIM 110 that did not respond or a communication failure, e.g., part of the fiber ring is non-operational. For example, process 500 can issue a command to the IIM 110 that did not respond in an opposite direction. For example, if the original direction was clockwise, process 500 would issue a command in a counterclockwise direction, and vice-versa. If a response is received from the IIM 110, process 500 may determine that the IIM 110 is operational and part of the fiber ring (e.g., in the direction of the original command) is not working. Similar steps are taken to determine the cause of the failure.

With reference again to block 570, based on the analysis performed at block 560, process 500 may reconfigure the system and saves the system's configuration. For example, if an IIM 110 did not respond, process 500 may attempt to reset that IIM. Process 500 may reconfigure the system to prevent an imbalanced injection by issuing additional commands to other IIMs 110 to change their impedance injection settings.

Figure 6:
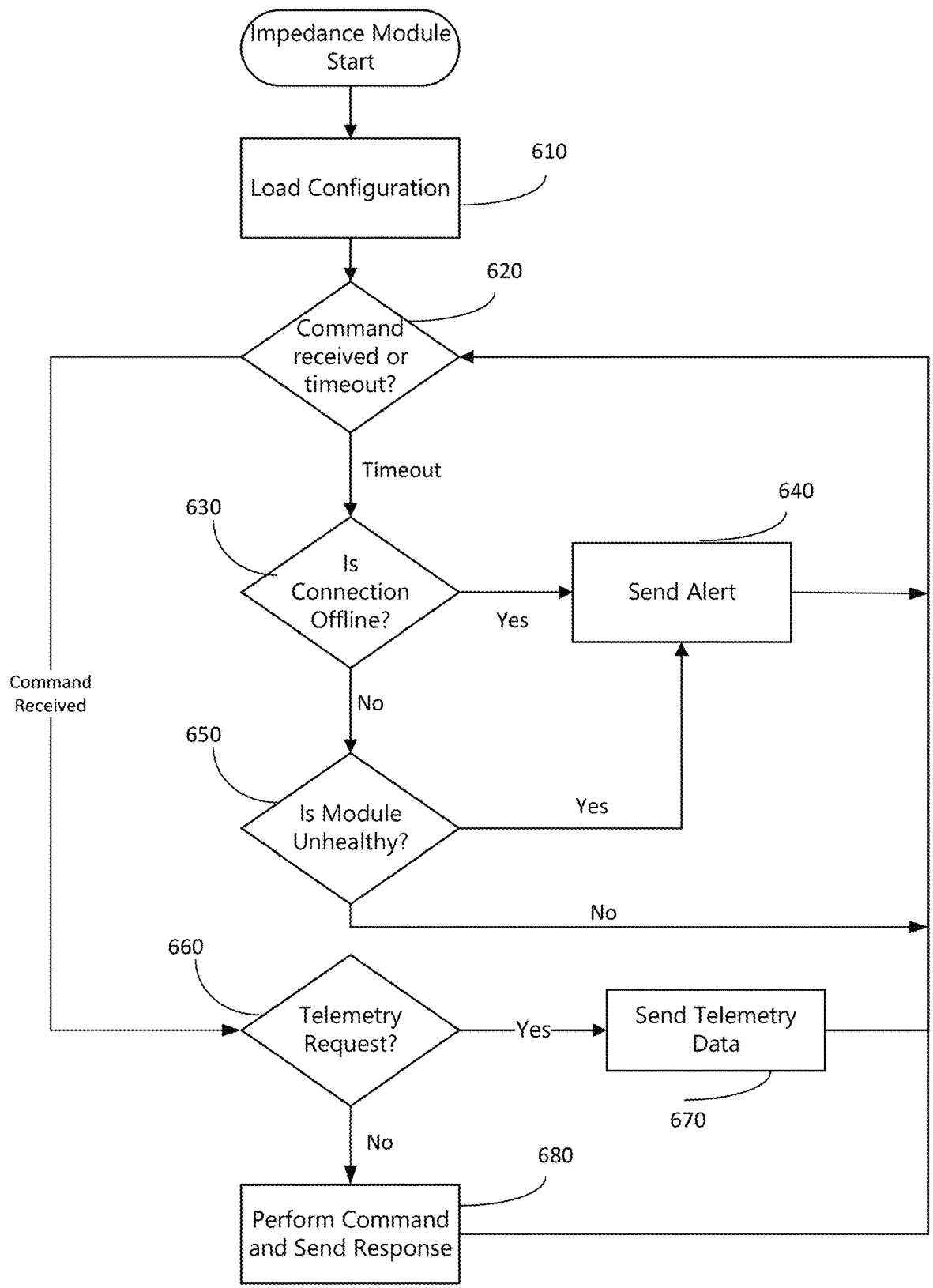
FIG. 6 is a flow diagram illustrating a process performed by the impedance injection module according to an embodiment.

FIG. 6 is a flow diagram illustrating a process performed by impedance injection module 110 in system 200 according to an embodiment. Process 600 may be performed by processing logic which may include software, hardware, or a combination thereof.

Referring to process 600, at block 610, IIM configuration is loaded. The configuration can be loaded from storage 430 by CPUs 410 or FPGA 420. This can be at power up, triggered by an event on an adjacent device (signaled on I/O interface 450), or by a command issued by a user (e.g., using the console communication). At block 620, process 600 may listen to commands/requests. If no command/request has been received within a period of time, process 600 may time out, and proceed to block 630. If a command or request is received, process 600 proceeds to block 660. At block 660, process 600 may determine whether the command is a telemetry data request. If the command is a telemetry data request, process 600 moves to block 670 where telemetry data collected and measured by IIM 110 is sent. If process 600, at block 660, determines that the command is not a telemetry data request, process 600 proceeds to block 680. At block 680, process 600 performs the command received and sends an appropriate message, which may be an acknowledgment of successful command execution; or any specific information that is being requested of the IIM in the command. As previously described, the command may include impedance-related inductance/capacitance magnitude, angle (e.g., impedance lag/lead value), IIM mode of operation, IIM reconfiguration, etc.

At block 630, process 600 determines whether its connection is offline. If the connection is offline, process 600 may attempt to send an alert at block 640 by communicating with adjacent network peers (e.g., adjacent IIMs 110). Depending upon the state of the network (e.g., dual-ring fiber optic network), the message (or alert in this case) may or may not make it to the PLC 220. Any internal communication failures within the IIM 110 are also flagged, and appropriate alerts are sent to the adjacent network peers.

If process 600 at block 630 determines that the connection is not offline, it moves to block 650. At block 650, process 600 determines whether it is unhealthy (e.g., by performing self-diagnostics). The self-diagnostics may include but are not limited to, checking the health of impedance injection components (e.g., impedance 485 of FIG. 4), transceiver components (e.g., PHY/transceiver 460 of FIG. 4), memory and storage sanity (e.g., memory 440 and storage 430 of FIG. 4, respectively), and power components (e.g., power 465 of FIG. 4). If process 600 at block 650 determines that it is unhealthy, it sends an alert at block 640. The alert may indicate that an operating parameter of the IIM 110 (e.g., temperature) is out of range or approximately out of range. It may also include information of any unwanted power system event which necessitated the IIM to halt impedance injection, for example power system frequency going out of range, transmission line current temporarily surging beyond the operational capacity of IIM, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the application have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A power flow control system, comprising:
a plurality of impedance injection modules (IIMs) distributed along and connected in series to one or more power transmission lines;
a plurality of dual-ring fiber optic networks, each dual-ring fiber optic network including a pair of fiber rings that provide data flow in opposite directions; and
redundant power line coordinators in communication with the plurality of IIMs through the plurality of dual-ring fiber optic networks.

2. The power flow control system of claim 1, wherein the one or more power transmission lines include three-phase power transmission lines, each IIM is connected to the three-phase power transmission lines to inject impedance into the three-phase power transmission lines.

3. The power flow control system of claim 2, wherein
the plurality of dual-ring fiber optic networks include three dual-ring fiber optic networks; and
for each IIM from the plurality of IIMs, each phase of the IIM is connected to a dual-ring fiber optic network from the three dual-ring fiber optic networks, to enable data flow between the IIM and the redundant power line coordinators.

4. The power flow control system of claim 1, wherein the redundant power line coordinators include a primary power line coordinator configured to issue a command or a request to a target IIM via a fiber ring of a dual-ring fiber optic network, and a secondary power line coordinator configured to operate as the primary power line coordinator when there is a failure in the primary power line coordinator.

5. The power flow control system of claim 4, wherein the command or request is serially forwarded from one IIM to another IIM until the command reaches the target IIM.

6. The power flow control system of claim 4, wherein the target IIM sends a response to the primary power line coordinator responsive to the command or request issued by the primary power line coordinator.

7. The power flow control system of claim 6, wherein the response is serially forwarded from one IIM to another IIM until the response reaches the primary power line coordinator.

8. The power flow control system of claim 4, wherein
when the primary power line coordinator is configured to issue the command to the target IIM, the command includes at least one of: impedance-related inductance or capacitance magnitude, an impedance lag or lead angle, an IIM mode of operation, or IIM reconfiguration; or
when the primary power line coordinator is configured to issue the request to the target IIM, the request includes a telemetry data request.

9. A method for a power line coordinator, comprising:
sending a command or a telemetry data request to a target impedance injection module (IIM);
determining whether a response was received from the target IIM;
in response to determining that the response was received from the target IIM, examining the response to determine whether the response includes an alert; and
in response to determining that the response includes an alert, analyzing the alert, and reconfiguring a power flow control system and saving configuration information of the power flow control system based on the alert;
wherein the power flow control system comprises the power line coordinator, a plurality of impedance injection modules (IIMs) including the target IIM, and a plurality of dual-ring fiber optic networks through which the power line coordinator and the impedance injection modules communicate with one another.

10. The method of claim 9, wherein
the alert indicates an operating parameter of the target IIM is out of range or approximately out of range; and
reconfiguring the power flow control system comprises:
issuing a command to shut down the target IIM, and issuing additional commands to other IIMs from the plurality of IIMs to compensate for the shutdown of the target IIM.

11. The method of claim 9, further comprising:
in response to determining that the response was not received from the target IIM, analyzing a failure in receiving the response by determining whether the failure is caused by the target IIM or caused by a communication failure in a dual-ring fiber optic network through which the power line coordinator and the target IIM communicate with one another; and
reconfiguring the power flow control system and saving the configuration information of the power flow control system based on the determination on whether the failure is caused by the target IIM or caused by the communication failure in the dual-ring fiber optic network.

12. The method of claim 11, wherein reconfiguring the power flow control system comprises:
when it is determined that the failure in receiving the response is caused by the target IIM, attempting to reset the target IIM, and issuing commands to other IIMs from the plurality of IIMs to change their impedance injection settings.

13. The method of claim 11, further comprising:
prior to sending the command or telemetry data request to the target IIM, loading configuration information of the power line coordinator; and
updating the configuration information of the power flow control system.

14. The method of claim 11, wherein
sending the command or telemetry data request to the target IIM comprises: sending the command or telemetry data request to the target IIM through a first fiber ring of the dual-ring fiber optic network; and
determining whether the failure is caused by the target IIM or caused by the communication failure in the dual-ring fiber optic network comprises:
issuing another command to the target IIM through a second fiber ring of the dual-ring fiber optic network, wherein the first and second fiber rings provide data flow in opposite directions, and
when it is determined that a response to the other command is received from the target IIM, determining that the failure is caused by the communication failure in the dual-ring fiber optic network.

15. The method of claim 9, wherein the configuration information of the power flow control system includes at least one of: a number of IIMs included in the power flow control system, a position of each IIM, an address of each IIM, a functionality of each IIM, or specifications of each IIM.

16. A method for an impedance injection module (IIM), comprising:
determining, by the IIM, whether a command has been received within a time period;
in response to determining that the command has been received within the time period, determining, by the IIM, whether the command is a telemetry data request;
in response to determining that the command is a telemetry data request, sending, by the IIM, telemetry data collected and measured by the IIM; and
otherwise, in response to determining that the command is not a telemetry data request, performing, by the IIM, the command and sending a response.

17. The method of claim 16, further comprising:
in response to determining that the command has not been received within the time period, determining, by the IIM, whether a connection of the IIM is offline;
in response to determining that the connection of the IIM is offline, attempting, by the IIM, to send an alert through an adjacent IIM;
otherwise, in response to determining that the connection of the IIM is not offline, determining, by the IIM, whether the IIM is unhealthy; and
in response to determining that the IIM is unhealthy, sending, by the IIM, an alert that indicates an operating parameter of the IIM is out of range or approximately out of range, or a power system event is causing the IIM to halt impedance injection.

18. The method of claim 16, further comprising:
prior to determining whether the command has been received within the time period, loading, by the IIM, configuration information of the IIM.

19. The method of claim 16, wherein the telemetry data includes at least one of: a voltage, a current, a device temperature, a device status, or other diagnostic data.

20. The method of claim 16, wherein the IIM is among a plurality of impedance injection modules comprised in a power flow control system, the power flow control system further comprises power line coordinators and dual-ring fiber optic networks through which the power line coordinators and the impedance injection modules communicate with one another.

\* \* \* \* \*